United States Patent
Nobuaki et al.

(10) Patent No.: US 6,256,105 B1
(45) Date of Patent: *Jul. 3, 2001

(54) COPY SYSTEM AND COPY CONTROLLER

(75) Inventors: Yokoyama Nobuaki, Tokyo; Nishino Seiichi, Kanazawa; Kishi Kimiharu, Tokyo, all of (JP)

(73) Assignee: Silver Seiko Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/924,317

(22) Filed: Sep. 5, 1997

(30) Foreign Application Priority Data

Sep. 9, 1996 (JP) .................................... 8-260308

(51) Int. Cl.[7] ............................. G06F 15/00; H04N 1/32; H04N 1/00
(52) U.S. Cl. ......................... 358/1.15; 358/442; 358/434
(58) Field of Search .................................. 358/468, 442, 358/444, 404, 405, 406, 1.1, 1.2, 1.3, 1.9, 1.14, 1.17, 1.15, 1.18; 379/100.01, 100.02, 9, 10; 395/101, 102, 103, 109, 114, 117

(56) References Cited

U.S. PATENT DOCUMENTS

| | | | |
|---|---|---|---|
| 4,910,607 | * | 3/1990 | Kita et al. ............................ 358/400 |
| 5,058,038 | * | 10/1991 | Motoyama et al. .................. 364/519 |
| 5,099,336 | * | 3/1992 | Moriya ................................ 358/450 |
| 5,113,267 | * | 5/1992 | Lee ..................................... 358/448 |
| 5,128,879 | * | 7/1992 | Greve et al. ......................... 364/526 |
| 5,142,667 | * | 8/1992 | Dimperio et al. ................... 395/115 |
| 5,146,343 | * | 9/1992 | Fuji .................................... 358/450 |
| 5,191,429 | * | 3/1993 | Rourke ............................... 358/450 |
| 5,260,718 | * | 11/1993 | Rommelmann et al. ......... 346/107 R |
| 5,335,005 | * | 8/1994 | Sellers ................................ 346/160 |
| 5,361,329 | * | 11/1994 | Morita ................................ 395/102 |
| 5,483,621 | * | 1/1996 | Ohtaka ............................... 395/110 |
| 5,613,017 | * | 3/1997 | Rao et al. ........................... 382/174 |
| 5,644,411 | * | 7/1997 | Tamagaki et al. .................. 358/529 |
| 5,828,461 | * | 10/1998 | Kubo .................................. 358/302 |
| 6,034,705 | * | 3/2000 | Tolle et al. .......................... 347/195 |

* cited by examiner

Primary Examiner—Madeleine Nguyen
(74) Attorney, Agent, or Firm—Oblon, Spivak, McClelland, Maier & Neustadt, P.C.

(57) ABSTRACT

A copy system includes a copy controller which is connected to a scanner and a plotter via interface sections. Based on key input from a key-input section, the CPU control section of the copy controller inputs image data from the scanner one line or one block at a time and stores the image data into a storage section. After the image data is subjected to image processing, the CPU control section immediately outputs the image data to the plotter one line or one block at a time.

24 Claims, 7 Drawing Sheets

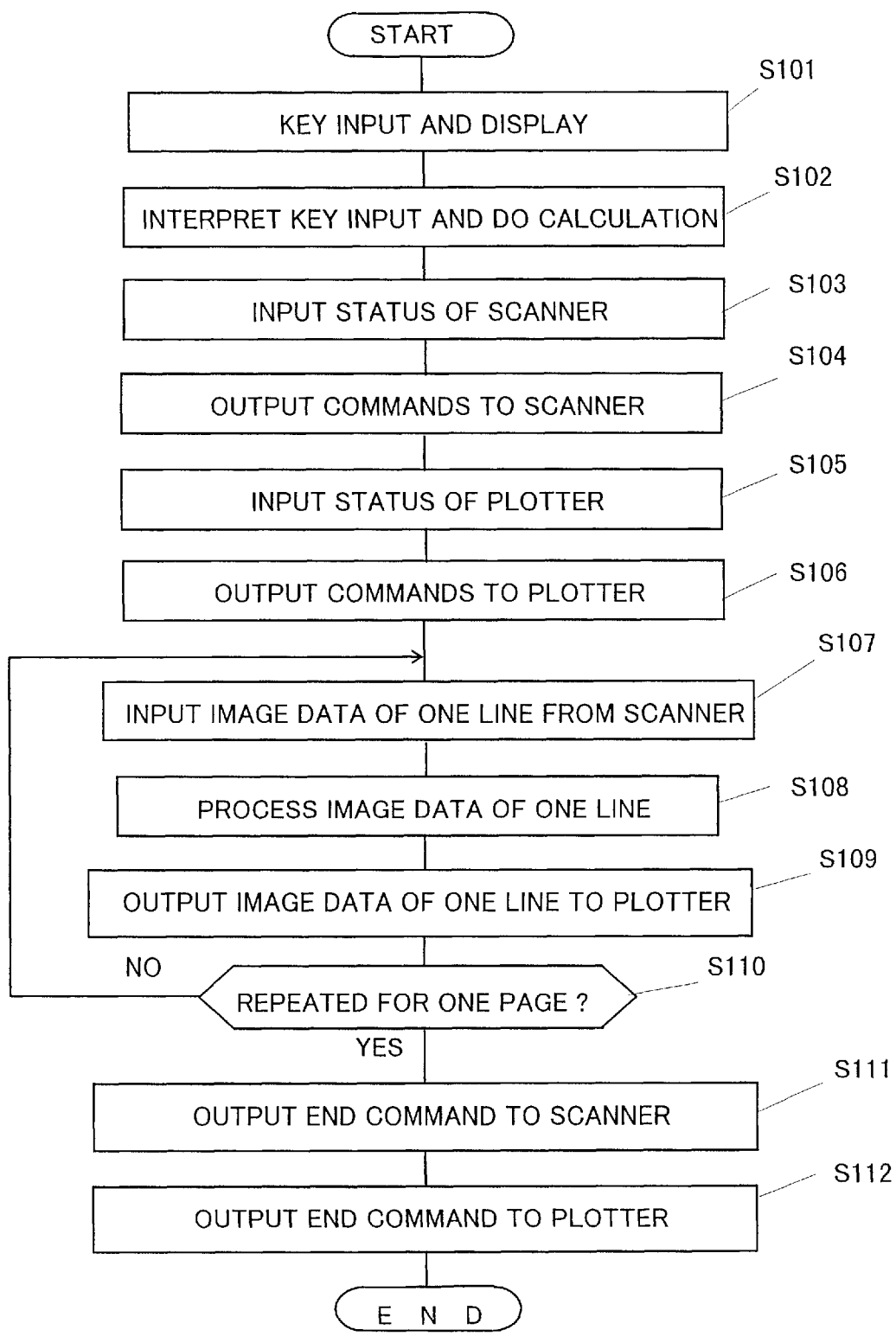

COPY SYSTEM AND COPY CONTROLLER

BACKGROUND OF THE INVENTION

1. Field of the Invention

The present invention relates to a copy system and a copy controller, and more particularly to a copy system composed of a scanner, a plotter, and a copy controller, as well as to the copy controller itself.

2. Description of the Related Art

A conventional color copy system is generally composed of a computer into which an image processing program has been installed, and a color scanner and a color plotter connected to the computer via cables. Since such a conventional system has been designed to provide high performance, a user is required to have expert level technical knowledge on color management, and to memorize how to set and operate the image processing program through use of a thick manual. Therefore, using the conventional color copy system is difficult for beginners (untrained persons).

Moreover, in the conventional color copy system, after complete image data of an original document obtained through use of a scanner are first stored into a magnetic disk device or a similar device, image processing is performed for the image data, and an image obtained through the image processing is then output to the plotter. Therefore, the computer must have a storage means having a large capacity for storing complete image data. Moreover, the total processing time from the start of input of image data to the start of output of an image is sometimes on the order of a few tens of minutes.

SUMMARY OF THE INVENTION

An object of the invention is to provide a copy system that uses a dedicated copy controller which is formed separately from a scanner and a plotter and is connected to the scanner and the plotter via interfaces and cables.

Another object of the invention is to provide a dedicated copy controller which is formed separately from a scanner and a plotter and is connected to the scanner and the plotter via interfaces and cables.

To achieve the above objects, the present invention provides a copy system which comprises a scanner having an interface, a plotter having an interface, and a copy controller which is formed separately from the scanner and the plotter and is connected to the scanner and the plotter via interfaces and cables. In accordance with an operation command from an operation section, the copy controller reads in image data from the scanner one line or one block at a time and performs image processing for the image data, and outputs processed image data to the plotter one line or one block at a time.

The present invention also provides a copy controller which, in accordance with an operation command from an operation section, reads in image data from a scanner one line or one block at a time, performs image processing for the image data, and outputs processed image data to a plotter one line or one block at a time.

In the copy system and the copy controller according to the present invention, the scanner is preferably a color scanner and the plotter is preferably a color plotter.

In the copy system and the copy controller according to the present invention, the scanner preferably has a structure such that the resolution of the scanner can be set in accordance with a command input from the outside, and the copy controller preferably has a structure such that it calculates the number of pixels in accordance with the size and resolution of an output image to be output by the plotter, calculates an enlargement ratio of an original document based on the number of pixels, calculates a resolution of the scanner based on the thus-calculated enlargement ratio, outputs a command to the scanner to designate the thus-determined resolution, reads In image data from the scanner one line or one block at a time, and outputs the image data to the plotter one line or one block at a time in order to obtain an enlarged or reduced copy.

In the copy system and the copy controller according to the present invention, the scanner preferably has a structure such that the resolution of the scanner can be set in accordance with a command input from the outside, the plotter preferably has a structure such that the enlargement ratio of the plotter can be set in accordance with a command input from the outside, and the copy controller preferably has a structure such that it calculates the number of pixels in accordance with the size and resolution of an output image to be output by the plotter, calculates an enlargement ratio of an original document based on the number of pixels, calculates a resolution of the scanner and an enlargement ratio of the plotter based on the thus-calculated enlargement ratio, outputs commands to the scanner and the plotter to designate the thus-determined resolution and enlargement ratio, reads in image data from the scanner one line or one block at a time, and outputs the image data to the plotter one line or one block at a time in order to obtain an enlarged or reduced copy.

In the copy system and the copy controller according to the present invention, after inputting image data from the scanner one line or one block at a time and performing imaging processing for the image data, the copy controller may output the processed image data of the same line or block a plurality of times for each scan of the plotter in the main scan direction. This operation enables the same image to be printed a plurality of times through use of a memory having a capacity for at least one line or one block, of image data.

In the copy system and the copy controller according to the present invention, the copy controller may divide an original image into a plurality of sections in the main scan direction, and repeats an operation for reading the original image one section at a time and for outputting the thus-read image to the plotter, so that an enlarged image whose width is greater than the width of printing paper is printed in the form of divided images. This operation enables an enlarged image having a width greater than the printing paper width to be printed in the form of divided images through use of a memory having a capacity for at least one line or one block of image data.

In the present invention, since a dedicated copy controller is used, a user is not required to know complicated and troublesome setting and operation methods of an image processing program. Thus, even a beginner can perform enlargement/reduction copy through quite simple operation. Accordingly, the copy system and the copy controller of the present invention can be used widely to produce copies of textbooks, teaching materials, posters, etc. at educational institutions such as conventional schools and crammers schools; copies of posters, notices, etc. at public facilities such as train and bus stations, city halls, community centers, and hospitals; and copies of advertising leaflets, posters, etc. at commercial facilities such as department stores, supermarkets, home centers, coops, and retail shops. Also, the copy system and the copy controller of the present invention can be used to copy designed illustrations and the like in the apparel industry. Moreover, the copy system and the copy controller of the present invention can be used to provide outputting services at copy shops, stationery shops, DPE shops, department stores, supermarkets, home centers, co-ops, etc.

Since the dedicated copy controller alternately repeats input and output of image data one line or one block at a time in order to carry out successive copy processing in real time, the capacity of the memory provided in the copy controller can be reduced. Also, since the overall amount of processing in the copy controller decreases, the time required to complete copy processing can be shortened.

Moreover, since the copy system can be built up through combined use of the dedicated copy controller and various kinds of existing scanners and plotters, the copy system can easily be constructed at reduced costs according to a user's desire.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 6 is a flowchart showing the processing carried out by the CPU control section shown in FIG. 1;

DETAILED DESCRIPTION OF PREFERRED EMBODIMENT

An embodiment of the present invention will be described with reference to the accompanying drawings.

Figure 1:
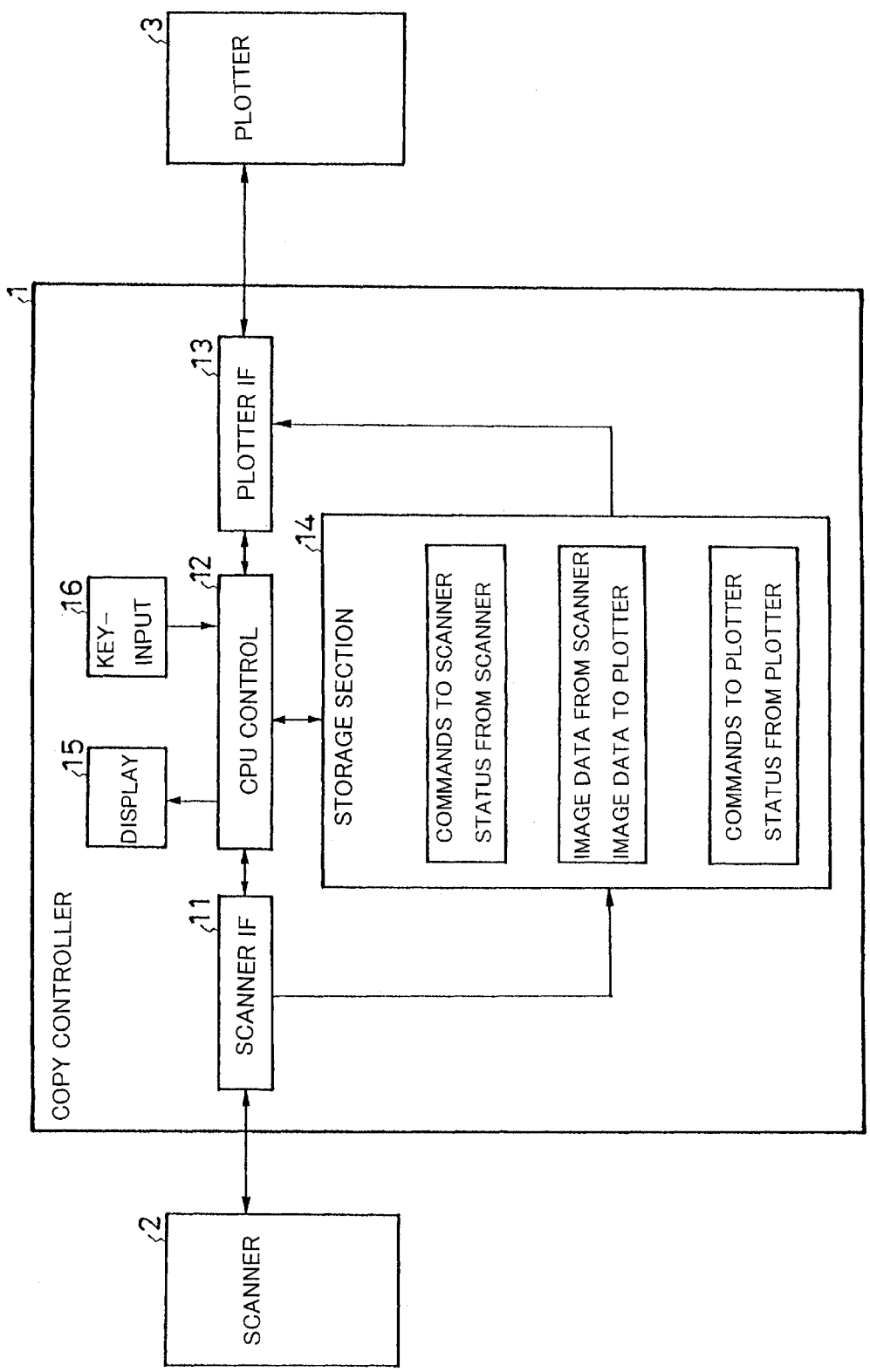
FIG. 1 is a block diagram showing the structures of a copy system and a copy controller according to an embodiment of the present invention.

As shown in FIG. 1, a copy system according to the present embodiment is mainly composed of a copy controller 1, a scanner 2, and a plotter (or printer) 3.

The copy controller 1 includes a scanner interface section (hereinafter referred to as the "scanner IF section") 11, a central processing unit control section (hereinafter referred to as the "CPU control section") 12, a plotter interface section (hereinafter referred to as the "plotter IF section") 13, a storage section 14, a display section 15, and a key-input section 16.

In the present embodiment, the scanner 2 is a color scanner of a line-by-line (one path) type adapted to read A4 documents to be copied. The scanner 2 has a dedicated bidirectional parallel interface or a SCSI (Small Computer Systems Interface). The resolution and other specifications of the scanner 2 can be set through use of commands input from the outside through the interface. The scanner 2 may be an ordinary scanner or a film scanner.

The plotter 3 is a large-sized color plotter that can print out A0- or A1-size images. Coat paper, glossy paper, glossy film, etc. can be used as printing paper. The resolution of the plotter 3 is fixed to 300 dpi.

The scanner IF section 11 includes an interface that conforms to the interface of the scanner 2. For example, when the scanner 2 has a dedicated bidirectional parallel interface the scanner IF section includes a bidirectional parallel interface, and when the scanner 2 has a SCSI parallel interface the scanner IF section includes a SCSI interface. The scanner IF section 11 may include a plurality of kinds of interfaces in order to cope with multiple platforms.

The CPU control section 12 is composed of a 16-bit or 32-bit microprocessor, or a like device.

The plotter IF section 13 includes an interface that conforms to the interface of the plotter 3, such as a parallel interface that conforms to Centronics specifications.

The storage section 14 includes a ROM (Read Only Memory) for storing programs, etc., and a RAM (Random Access Memory) for storing image data read from the scanner and other data. The RAM must have at least the capacity for storing the maximum amount of image data that is generated when the scanner 2 scans one line. However, the RAM is not required to have a capacity for storing image data of a complete original image. In practice, the RAM has a capacity of at least a few thousand bites.

Figure 2:
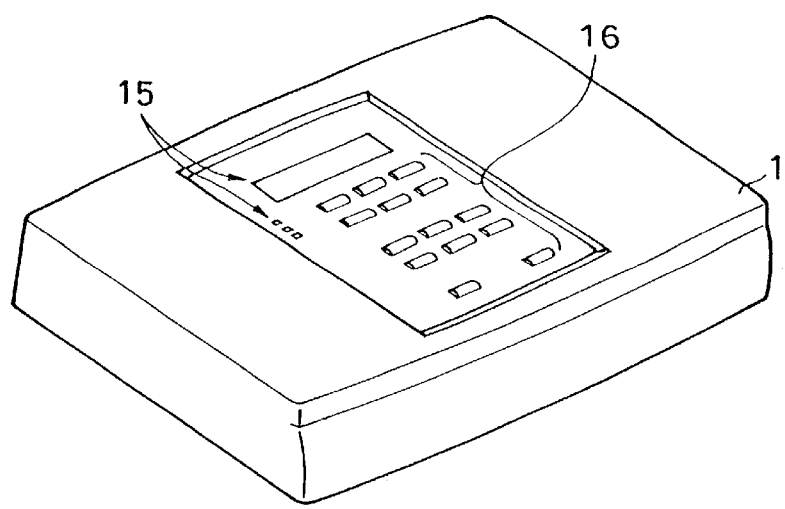
FIG. 2 is a front perspective view showing the outside appearance of the copy controller shown in FIG. 1.
Figure 3:
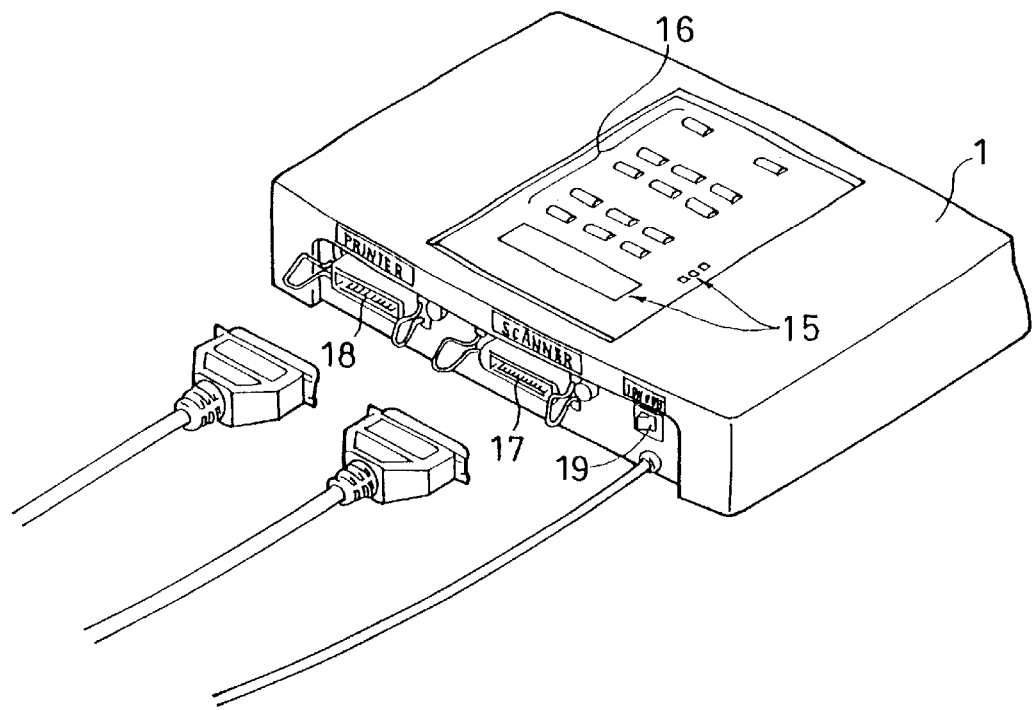
FIG. 3 is a rear perspective view showing the outside appearance of the copy controller shown in FIG. 1.

FIGS. 2 and 3 are front and rear perspective views showing the outward appearance of the copy controller 1. As is apparent from these drawings, a display section 15 and a key-input section 16 are provided at the center of the top surface. On the back face are provided a scanner connector 17, a plotter connector 18, and a power switch 19. Needless to say, the scanner 2 is connected to the scanner connector 17 via a cable, and the plotter 3 is connected to the plotter connector 18 via a cable.

Figure 4:
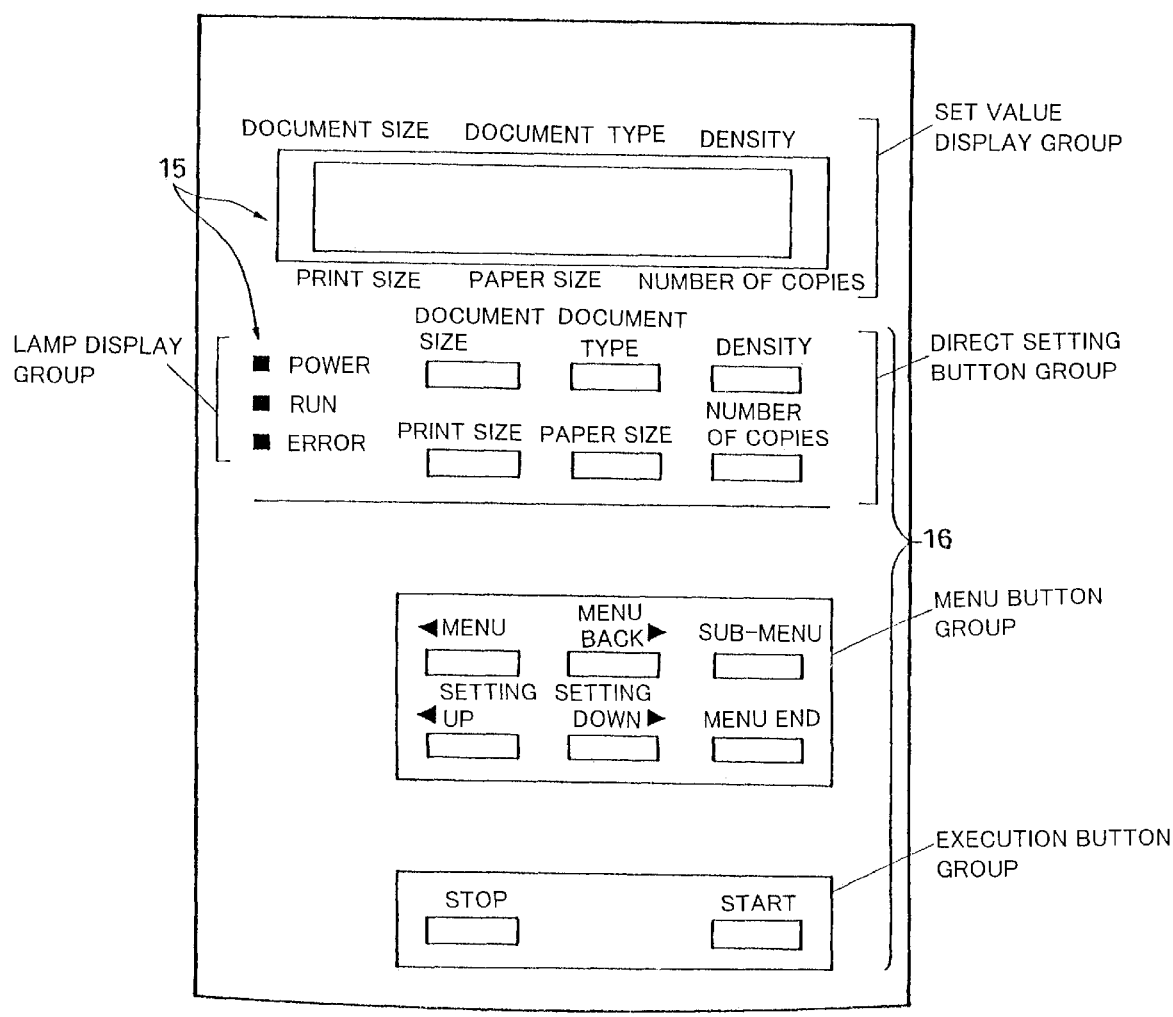
FIG. 4 is an enlarged view of a display section and a key-input section shown in FIG. 1.

FIG. 4 is a plan view showing the display section 15 and the key-input section 16 of the copy controller 1. The display section 15 includes a set value display group composed of a liquid crystal display, and a lamp display group composed of light-emitting diodes. The set value display group displays the size and type of an original document, density, print size, paper size, and number of copies. The lamp display group displays power-on state, run state, and occurrence of an error.

Continuing reference to FIG. 4, the key-input section 16 is composed of a direct setting button group, a menu button group, and an execution button group. The direct setting button group includes a plurality of setting buttons for setting the size and type of an original document, density, print size, paper size, and number of copies. The menu button group includes a menu button, a menu-back button, a sub-menu button, a setting-up button, a setting-down button, and a menu-end button. The execution button group includes a stop button and a start button.

The document size button is used to set an area where an original document is read through selection of one of several fixed sizes. Whenever the document size button is depressed, the document size displayed on the display section 15 is changed cyclically in the sequence A4 →B5 →A5 →B6 →A6→A4.

The document type button is used to change the internal processing in accordance with the type of original document. Whenever the document type button is depressed, the type of document displayed on the display section 15 is changed cyclically in the sequence color photograph→monochrome photograph →monochrome characters→color photograph.

The density button is used to increase or decrease the density of an original image to be printed. Whenever the density button is depressed, the density displayed on the display section 15 is changed cyclically in the sequence normal→+1→+2→+3→−3→−2→−1→normal.

The print size button is used to set a print size of a copied image through selection of one of several fixed sizes. Whenever the print size button is depressed, the print size displayed on the display section 15 is changed cyclically in the sequence 914 roll→A0→B1 roll→610 roll→A1→B2→A2→B3→A3→B4→914 roll.

The paper size button is used to set the size of print paper. Whenever the paper size button is depressed, the paper size displayed on the display section 15 is changed cyclically in the sequence 914 roll→A0→B1→roll 610 roll→A1→B2→A2→B3→A3→B4→914 roll.

The copy number button is used to set the number of copies. Whenever the copy number button is depressed, the number of copies displayed on the display section 15 is incremented. The number of copies can be set only when rolled paper is selected through operation of the paper size button.

Figure 5A:
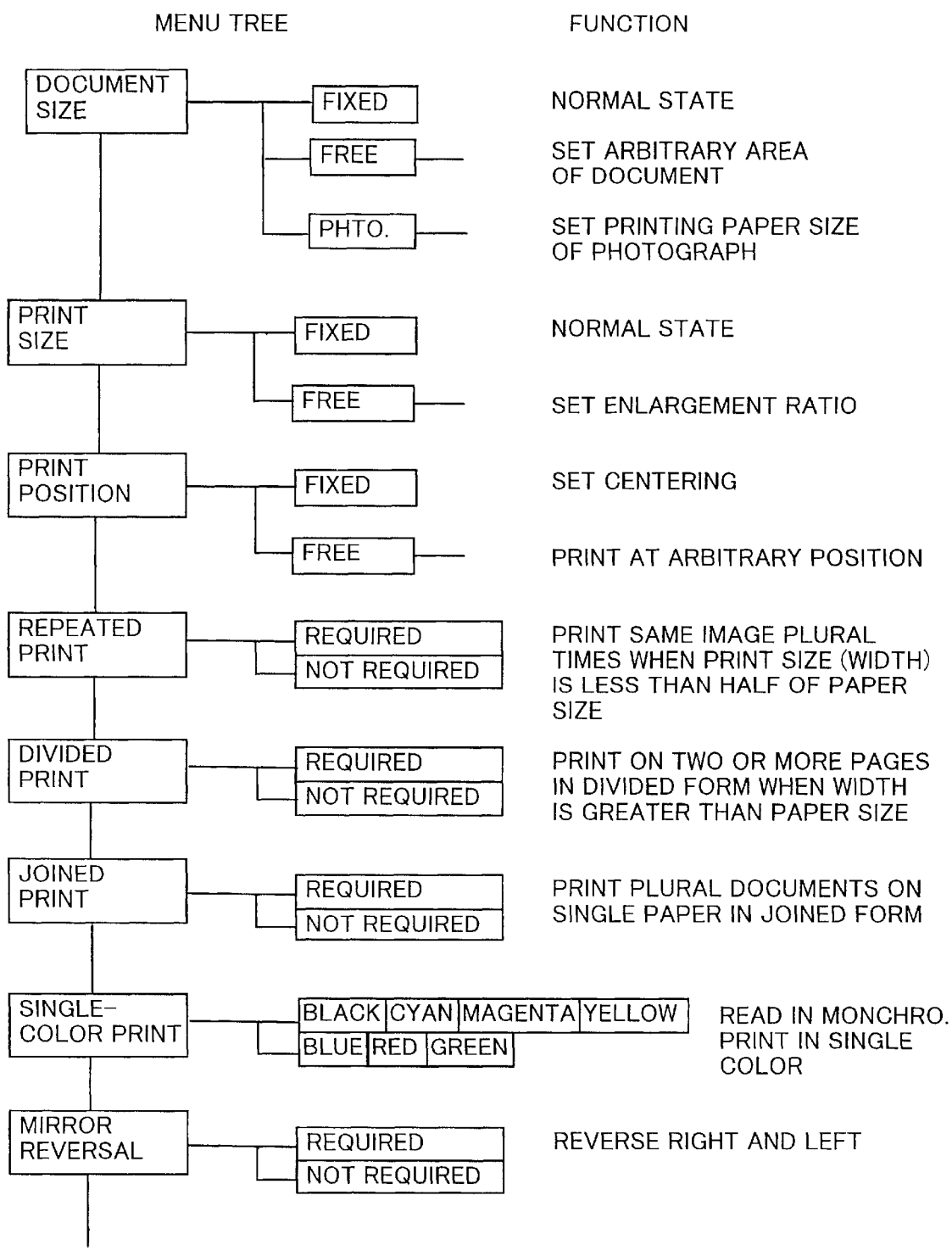
FIGS. 5A and 5B are diagrams showing the menu tree of the copy controller shown in FIG. 1.
Figure 5B:
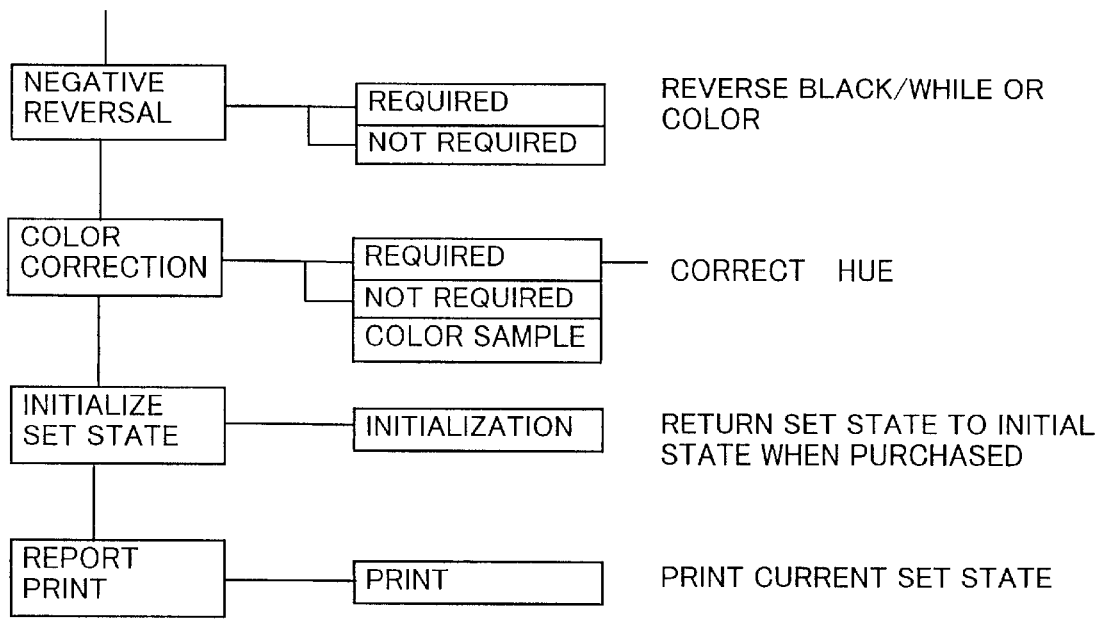

FIG. 5 shows a menu tree including various menus that can be selected by the menu button group. As is apparent from FIG. 5, whenever the menu button is depressed, the menu is changed cyclically in the sequence document size→print size→print position→repeated print→divided print joined print→single-color print→mirror reversal negative reversal→color correction→set state initialization→report print. Since the details of the menu and sub-menus are not related directly to the gist of the present invention, descriptions therefor will be omitted.

Referring to FIG. 6, the processing of the CPU control section 12 includes a key input/display step S101, a key-input interpretation/calculation step S102, a scanner status input step S103, a scanner command output step S104, a plotter status input step S103, a scanner command output step S104, a plotter status input step S105, a plotter command output step S106, a one-line-image-data input step S107, a one-line-image-data processing step S108, a one-line-image-data output step S109, a one-page repeat judgment step S110, a scanner end command output step Slll, and a plotter end command output step S112.

Next, the operations of the copy system and the copy controller according to the present invention will be described.

Before copy operation is started, the scanner 2 and the plotter 3 are connected to the copy controller 1 via cables, and the copy controller 1, the scanner 2, and the plotter 3 are turned on.

When the copy controller 1 is turned on, the CPU control section 12 reads in key-input values set by the key-input section 16 or default values, and displays them on the display section 15 (step S101).

In this state, a user depresses the various setting buttons of the key-input section 16 to display on the display section 15 a desired document size, document type, density, print size, paper size and the number of copies, and then depresses the start button of the key-input section 16 in order to start the copy processing by the copy controller 1.

When the copy processing is started, the CPU control section 12 interprets the key input that has been performed by the user through use of the key-input section 16, and determines the processing to be performed by the scanner 2 and the plotter 3 through calculation (step S102).

Subsequently, the CPU control section 12 inputs the status of the scanner 2 via the scanner IF section 11 and obtains information related to the type of the scanner 2 and error information (step S103). Based on the information related to the type of the scanner 2, usable functions are found.

Next, based on the results of the calculation performed in step S102, the CPU control section 12 outputs commands to the scanner 2 via the scanner IF section 11 in order to designate a color or monochrome mode, a gradation treating method such as error diffusion, a resolution, the number of pixels, a density, a color adjustment, a processing method, etc. (step S104).

Subsequently, the CPU control section 12 inputs the status of the plotter 3 via the plotter IF section 13 and obtains the result of automatic paper size checking performed by the plotter 3 and error information (step S105). In the case where the plotter 3 does not have a function for outputting its status, this step is omitted.

Next, based on the results of the calculation performed in step S102, the CPU control section 12 outputs commands to the plotter 3 via the plotter IF section 13 in order to designate color or monochrome ink, a plotting speed, the number of pixels, a processing method, etc. (step S106).

Subsequently, the CPU section 12 inputs image data of one line from the scanner 2 via the scanner IF section 11 under conditions designated by the commands (step S107).

Next, the CPU section 12 processes the image data of one line in order to convert its data format that conforms to the scanner 2 to a data format that conforms to the plotter 3 (step S108). Also, as needed, calculation and processing are performed for color conversion, repeated print, margin determination, etc.

Subsequently, the CPU control section 12 outputs the image data of one line to the plotter 3 under conditions designated by the commands (step S109).

Next, the CPU control section 12 judges whether the above-described procedure has been repeated for one page (step S110). When it is judged that the above-described procedure has been repeated for one page, the CPU control section 12 outputs an end command to the scanner 2 (step S111) and also outputs an end command to the plotter 3 (step S112).

Examples of particular operations will now be described.

Figure 7:
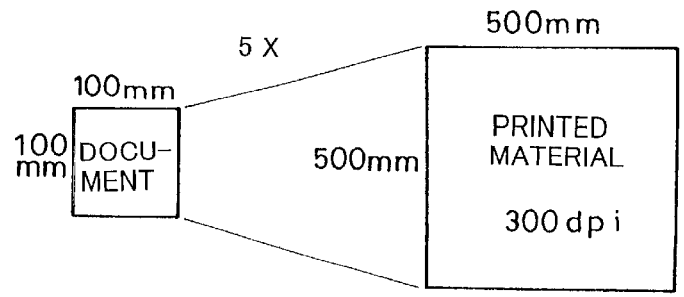
FIG. 7 is a diagram used for explaining an example in which an original image is enlarged five times in the copy system according to the present embodiment.

(1) The case where an original document is to be copied while being enlarged 5 times, as shown in FIG. 7; the resolution of the plotter 3 is fixed to 300 dpi; and the resolution of the scanner 2 can be increased to 1500 dpi (enlargement ratio: 5).

(a) The CPU control section 12 outputs commands to the scanner 2 in order to set the scanner 2 such that the scanner 2 scans part of the document corresponding to one line with a resolution 300 dpi×5=1500 dpi (step S104).

(b) Next, the CPU section 12 inputs image data of one line from the scanner 2 (step S107).

(c) Subsequently, the CPU section 12 processes the image data of one line for the purpose of format conversion and the like (step S108), and outputs the processed image data to the plotter 3 as it is (step S109).

(d) The CPU control section 12 repeats the procedures (b) and (c) for the complete page.

As described above, since the one-line image data input from the scanner 2 is immediately output to the plotter 3 after image processing, the output of the image can be started within a time on the order of 10 seconds after the input of the image data has been started. Therefore, the processing time is quite short compared to that of a conventional copy system in which a few tens of minutes are needed to start the output of processed image after the input of image data has been started.

(2) The case where an original document is to be copied while being enlarged 5 times as shown in FIG. 7; the resolution of the scanner 2 is fixed to 300 dpi; and the enlargement ratio of the plotter 3 can be increased up to 1500 dpi (enlargement ratio: 5).

(a) The CPU control section 12 outputs commands to the plotter 3 in order to set the plotter 3 such that the plotter 3 prints part of the document corresponding to one line with a resolution 300 dpi ×5 =1500 dpi (or with an enlargement ratio of 500%) (step S106).

(b) Next, the CPU section 12 inputs image data of one line from the scanner 2 (step S107).

(c) Subsequently, the CPU section 12 processes the image data of one line for the purpose of format conversion and the like (step S108), and outputs the processed image data to the plotter 3 as it is (step S109).

(d) The CPU control section 12 repeats the procedures (b) and (c) for the complete page. (3) The case where an original document is to be copied while being enlarged 5 times as shown in FIG. 7; the resolution of the scanner can be increased only up to 1200 dpi (enlargement ratio: 4); and the plotter 3 has a function for enlargement.

(a) The CPU control section 12 outputs commands to the scanner 2 in order to set the scanner 2 such that the scanner 2 scans part of the document corresponding to one line with a resolution 1200 dpi (enlargement ratio: 4) (step S104).

(b) The CPU control section 12 outputs commands to the plotter 3 in order to set the plotter 3 such that the plotter 3 prints part of the document corresponding to one line after enlargement at a ratio of 1500 dpi/1200 dpi (enlargement ratio: 5/4) (step S106).

(c) Next, the CPU section 12 inputs image data of one line from the scanner 2 (step S107).

(d) Subsequently, the CPU section 12 processes the image data of one line for the purpose of format conversion and the like (step S108), and outputs the processed image data to the plotter 3 as it is (step S109).

(e) The CPU control section 12 repeats the procedures (c) and (d) for the complete page.

Figure 8:
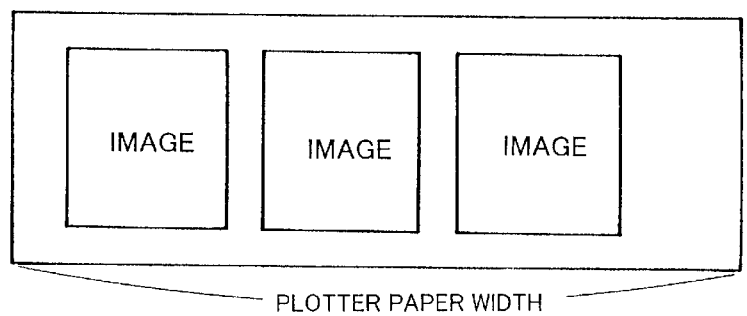
FIG. 8 is a diagram used for explaining an example in which repeated print is carried out in the copy system according to the present embodiment.

(4) The case where the same image is printed a plurality of times, is shown in FIG. 8.

(a) The CPU section 12 inputs image data of one line from the scanner 2.

(d) Subsequently, the CPU section 12 outputs the oneline image data to the plotter 3, for example, three times in the main scan direction.

(e) The CPU control section 12 repeats the procedures (a) and (b) for the complete page.

Figure 9:
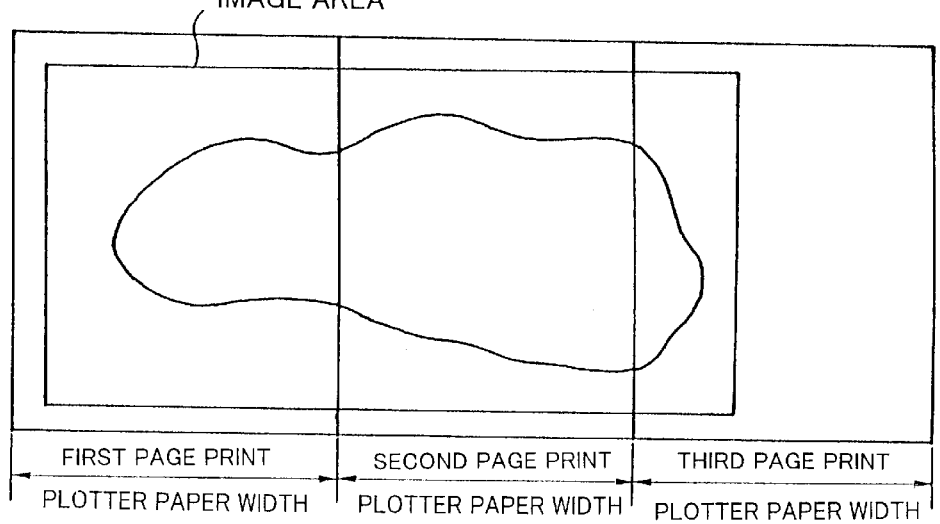
FIG. 9 is a diagram used for explaining an example in which divided print is carried out in the copy system according to the present embodiment.

(5) The case where divided print, as shown in FIG. 9, is performed.

(a) The CPU section 12 outputs commands to the scanner 2 such that the scanner 2 scans the left ⅓ of a document, the center ⅓ of the document, and the right ⅓ of the document with magnification at an enlargement ratio corresponding to the width of a single sheet of printing paper used in the plotter 3.

(b) Next, the CPU section 12 inputs from the scanner 2 image data of one line of the left ⅓ of the document.

(c) Subsequently, the CPU section 12 processes the image data of one line for the purpose of format conversion and the like, and outputs the processed image data to the plotter 3 as it is.

(d) The CPU control section 12 repeats the procedures (b) and (c) for the left ⅓ of the document in order to cause the plotter to print out a first page.

(e) Next, the CPU section 12 inputs from the scanner 2 image data of one line of the center ⅓ of the document.

(f) Subsequently, the CPU section 12 processes the image data of one line for the purpose of format conversion and the like, and outputs the processed image data to the plotter 3 as it is.

(g) The CPU control section 12 repeats the procedures (e) and (f) for the center ⅓ of the document in order to cause the plotter to print out a second page.

(h) Next, the CPU section 12 inputs from the scanner 2 image data of one line of the right ⅓ of the document.

(i) Subsequently, the CPU section 12 processes the image data of one line for the purpose of format conversion and the like, and outputs the processed image data to the plotter 3 as it is.

(j) The CPU control section 12 repeats the procedures (h) and (i) for the right ⅓ of the document in order to cause the plotter to print out a third page.

In the above-described embodiment, image data is input from the scanner 2 and output to the plotter 3 one line at a time. However, image data may be input and output one block at a time, each block containing a few lines to a few tens of lines.

Obviously, numerous modifications and variations of the present invention are possible in light of the above teachings. It is therefore to be understood that within the scope of the appended claims, the present invention may be practiced otherwise than as specifically described herein.

What is claimed is:

1. A copy system comprising:
    a scanner having an interface;
    a plotter having an interface; and
    an all-in-one-type copy controller which is formed separately from said scanner and said plotter and is connected to said scanner and said plotter via interfaces and cables, wherein said copy controller comprises a key-input section, a CPU control section, a scanner interface, a plotter interface, a memory having a capacity for storing a portion of data of a complete original image, an operation section, and a housing which accommodates said CPU control section, said scanner interface, said plotter interface, said memory, and said operation section, wherein said key-input section is integrated with said housing, and in accordance with an operation command from said operation section, said CPU control section reading in image data from said scanner into said memory one of one line at a time and one block at a time, performing image processing, other than image processing for enlargement and reduction of images, for the image data said one of one line at a time and one block at a time immediately after the reading in of said one of one line at a time and one block at a time of said image data, and outputting processed image data from said memory to said plotter said one of one line at a time and one block at a time immediately after said performing image processing for the image data said one of one line at a time and one block at a time, wherein said one block includes at least one line, wherein a number of said at least one line of said block is smaller than a number of lines of a complete original scanned image, and wherein said scanner has a structure such that the resolution of said scanner is set in accordance with a command input from the outside, and said copy controller calculates a number of pixels in accordance with a size and resolution of an output image to be output by said plotter, calculates an enlargement ratio of an original document based on the number of pixels, calculates a resolution of said scanner based on the calculated enlargement ratio, outputs a command to said scanner to designate the determined resolution of said scanner, reads in image data from said scanner said one of one line at a time and one block at a time, and outputs the image data to said plotter said one of one line at a time and one block at a time in order to obtain one of an enlarged copy and a reduced copy, and wherein said CPU control section reads in said image data, performs said image processing, and outputs said processed image data either said one line at a time for said complete original image or said one block at a time for said complete original image.

2. A copy system according to claim 1, wherein said scanner is a color scanner and said plotter is a color plotter.

3. A copy system according to claim 1, wherein said scanner has a structure such that a resolution of said scanner is set in accordance with a command input from the outside; said plotter has a structure such that an enlargement ratio of said plotter is set in accordance with a command input from the outside; and said copy controller calculates a number of pixels in accordance with a size and resolution of an output image to be output by said plotter, calculates an enlargement ratio of an original document based on the number of pixels, calculates a resolution of said scanner and an enlargement ratio of said plotter based on the calculated enlargement ratio of said original document, outputs commands to said scanner and said plotter to designate the determined resolution of said scanner and enlargement ratio of said plotter, reads in image data from said scanner one of one line at a time and one block at a time, and outputs the image data to said plotter one of one line at a time and one block at a time in order to obtain one of an enlarged copy and a reduced copy.

4. A copy system according to claim 3, wherein said scanner is a color scanner and said plotter is a color plotter.

5. A copy system according to claim 1, wherein after inputting image data from said scanner one of one line at a time and one block at a time and performing image processing for the image data, said copy controller outputs the processed image data of the same one of one line and one block a plurality of times for each scan of said plotter in the main scan direction of said plotter, wherein a plurality of scanned images is output by said copy controller outputting the processed image data.

6. A copy system according to claim 1, the copy controller further comprising:

a display section, wherein said display section is integrated with said housing, and in accordance with a first input from said key-input section, said display section displaying said first input, and in accordance with a second input from said CPU section, said display section displaying said second input.

7. A copy system according to claim 1, wherein said key-input section includes keys that are closer to said housing when said keys are depressed.

8. A copy system according to claim 6, wherein said display section comprises:

keys that are closer to said housing when said keys are depressed; and indicators configured to indicate a status of said copy controller.

9. An all-in-one-type copy controller which comprises a key-input section, a CPU control section, a scanner interface, a plotter interface, a memory having a capacity for storing a portion of data of a complete original image, an operation section, and a housing which accommodates said CPU control section, said scanner interface, said plotter interface, said memory, and said operation section, wherein said key-input section is integrated with said housing, and, in accordance with an operation command from said operation section, said CPU control section reads in image data from a scanner into said memory one of one line at a time and one block at a time, performs image processing, other than image processing for enlargement and reduction of images, for the image data said one of one line at a time and one block at a time immediately after the image data is read in said one of one line at a time and one block at a time, and outputs processed image data from said memory to a plotter said one of one line at a time and one block at a time immediately after said image processing is performed for the image data said one of one line at a time and one block at a time, wherein said one block includes at least one line, wherein a number of said at least one line of said block is smaller than a number of lines of a complete original scanned image, wherein said scanner has a structure such that the resolution of said scanner is set in accordance with a command input from the outside; and said copy controller calculates a number of pixels in accordance with a size and resolution of an output image to be output by said plotter, calculates an enlargement ratio of an original document based on the number of pixels, calculates a resolution of said scanner based on the calculated enlargement ratio of said original document, outputs a command to said scanner to designate the determined resolution of said scanner, reads in image data from said scanner said one of one line at a time and one block at a time, and outputs the image data to said plotter said one of one line at a time and one block at a time in order to obtain one of an enlarged copy and a reduced copy, and wherein said CPU control section reads in said image data, performs said image processing, and outputs said processed image data either said one line at a time for said complete original image or said one block at a time for said complete original image.

10. A copy controller according to claim 9, wherein said scanner is a color scanner and said plotter is a color plotter.

11. A copy controller according to claim 9, wherein said scanner has a structure such that a resolution of said scanner is set in accordance with a command input from the outside;

said plotter has a structure such that an enlargement ratio of said plotter is set in accordance with a command input from the outside; and said copy controller calculates a number of pixels in accordance with a size and resolution of an output image to be output by said plotter, calculates an enlargement ratio of an original document based on the number of pixels, calculates a resolution of said scanner and an enlargement ratio of said plotter based on the calculated enlargement ratio of said original document, outputs commands to said scanner and said plotter to designate the determined resolution of said scanner and enlargement ratio of said plotter, reads in image data from said scanner one of one line at a time and one block at a time, and outputs the image data to said plotter one of one line at a time and one block at a time in order to obtain one of an enlarged copy and a reduced copy.

12. A copy controller according to claim 11, wherein said scanner is a color scanner and said plotter is a color plotter.

13. A copy controller according to claim 9, wherein after inputting image data from said scanner one of one line at a time and one block at a time and performing image processing for the image data, said copy controller outputs the processed image data of the same one of one line and one block a plurality of times for each scan of said plotter in the main scan direction.

14. An all-in-one copy controller according to claim 9 further comprising:

a display section, wherein said display section is integrated with said housing, and in accordance with a first input from said key-input section, said display section displaying said first input, and in accordance with a second input from said CPU section, said display section displaying said second input.

15. A copy system according to claim 14, wherein said display section comprises:

keys that are closer to said housing when said keys are depressed; and indicators configured to indicate a status of said copy controller.

16. A copy system according to claim 9, wherein said key-input section includes keys that are closer to said housing when said keys are depressed.

17. A copy system comprising:

a scanner having an interface;

a plotter having an interface; and an all-in-one-type copy controller which is formed separately from said scanner and said plotter and is connected to said scanner and said plotter via interfaces and cables, wherein said copy controller comprises a key-input section, a CPU control section, a scanner interface, a plotter interface, a memory having a capacity for storing a portion of data of a complete original image, an operation section, and a housing which accommodates said CPU control section, said scanner interface, said plotter interface, said memory, and said operation section, wherein said key-input section is integrated with said housing, and in accordance with an operation command from said operation section, said CPU control section reading in image data from said scanner into said memory one of one line at a time and one block at a time, performing image processing, other than image processing for enlargement and reduction of images, for the image data said one of one line at a time and one block at a time immediately after the reading in of said one of one line at a time and one block at a time of said image data, and outputting processed image data from said memory to said plotter said one of one line at a time and one block at a time immediately after said performing image processing for the image data said one of one line at a time and one block at a time, wherein said one block includes at least one line, wherein a number of said at least one line of said block is smaller than a number of lines of a complete original scanned image, wherein said copy controller divides an original image into a plurality of sections in the main scan direction, and repeats an operation for reading the original image one section at a time and for outputting the read image to said plotter, so that an enlarged image whose width is greater than the width of printing paper is printed in the form of divided images, and wherein said CPU control section reads in said image data, performs said image processing, and outputs said processed image data either said one line at a time for said complete original image or said one block at a time for said complete original image.

18. A copy system according to claim 17, the copy controller further comprising:

a display section, wherein said display section is integrated with said housing, and in accordance with a first input from said key-input section, said display section displaying said first input, and in accordance with a second input from said CPU section, said display section displaying said second input.

19. A copy system according to claim 18, wherein said display section comprises:

keys that are closer to said housing when said keys are depressed; and indicators configured to indicate a status of said copy controller.

20. A copy system according to claim 17, wherein said key-input section includes keys that are closer to said housing when said keys are depressed.

21. An all-in-one-type copy controller which comprises a key-input section, a CPU control section, a scanner interface, a plotter interface, a memory having a capacity for storing a portion of data of a complete original image, an operation section, and a housing which accommodates said CPU control section, said scanner interface, said plotter interface, said memory, and said operation section, wherein said key-input section is integrated with said housing, and, in accordance with an operation command from said operation section, said CPU control section reads in image data from a scanner into said memory one of one line at a time and one block at a time, performs image processing, other than image processing for enlargement and reduction of images, for the image data said one of one line at a time and one block at a time immediately after the image data is read in said one of one line at a time and one block at a time, and outputs processed image data from said memory to a plotter said one of one line at a time and one block at a time immediately after said image processing is performed for the image data said one of one line at a time and one block at a time, wherein said one block includes at least one line, wherein a number of said at least one line of said block is smaller than a number of lines of a complete original scanned image, wherein said copy controller divides an original image into a plurality of sections in the main scan direction of said scanner, and repeats an operation for reading the original image one section at a time and for outputting the read image to said plotter, so that an enlarged image whose width is greater than the width of printing paper is printed in the form of divided images, and wherein said CPU control section reads in said image data, performs said image processing, and outputs said processed image data either said one line at a time for said complete original image or said one block at a time for said complete original image.

22. An all-in-one copy controller according to claim 21 further comprising:

a display section, wherein said display section is integrated with said housing, and in accordance with a first input from said key-input section, said display section displaying said first input, and in accordance with a second input from said CPU section, said display section displaying said second input.

23. A copy system according to claim 21, wherein said key-input section includes keys that are closer to said housing when said keys are depressed.

24. A copy system according to claim 22, wherein said display section comprises:

keys that are closer to said housing when said keys are depressed; and indicators configured to indicate a status of said copy controller.

* * * * *

UNITED STATES PATENT AND TRADEMARK OFFICE
CERTIFICATE OF CORRECTION

PATENT NO. : 6,256,105 B1  
DATED : July 3, 2001  
INVENTOR(S) : Yokoyama et al.

Page 1 of 1

It is certified that error appears in the above-identified patent and that said Letters Patent is hereby corrected as shown below:

<u>Title page,</u>  
Item [75], Inventor's names are incorrect, Item [75] should read as follows:

-- [75] Inventors: Nobuaki Yokoyama, Tokyo; Seiichi Nishino, Kanazawa; Kimiharu Kishi, Tokyo, all of (JP) --

Signed and Sealed this

Twenty-ninth Day of January, 2002

*Attest:*

*Attesting Officer*

JAMES E. ROGAN  
*Director of the United States Patent and Trademark Office*